United States Patent [19]

Croce

[11] Patent Number: 4,663,964
[45] Date of Patent: May 12, 1987

[54] ELECTRONIC AIRTIGHTNESS TESTER

[75] Inventor: Carlo P. Croce, Leonia, N.J.

[73] Assignee: Warner-Lambert Company, Morris Plains, N.J.

[21] Appl. No.: 811,868

[22] Filed: Dec. 20, 1985

[51] Int. Cl.$^4$ ............................................. G01M 3/26
[52] U.S. Cl. ..................................................... 73/49.3
[58] Field of Search .................................. 73/49.3, 52

[56] References Cited

U.S. PATENT DOCUMENTS

| | | | |
|---|---|---|---|
| 3,117,441 | 1/1964 | Zimmermann | 73/52 X |
| 3,343,404 | 9/1967 | La Rosa et al. | 73/49.3 |
| 3,837,215 | 9/1974 | Massage | 73/49.3 X |
| 3,991,622 | 11/1976 | Oowada | 73/49.3 |
| 3,998,091 | 12/1976 | Paquett et al. | 73/49.3 X |
| 4,326,408 | 4/1982 | Kanoh | 73/49.3 |

FOREIGN PATENT DOCUMENTS

| | | | |
|---|---|---|---|
| 2351400 | 5/1976 | France | 73/49.3 |
| 1249859 | 10/1971 | United Kingdom | 73/49.3 |
| 1120200 | 10/1984 | U.S.S.R. | 73/49.3 |

Primary Examiner—Stewart J. Levy
Assistant Examiner—Joseph W. Roskos
Attorney, Agent, or Firm—Daniel A. Scola, Jr.; Henry C. Jeanette; Gary M. Nath

[57] ABSTRACT

Disclosed herein is an apparatus and method for testing the integrity of a package having a flexible surface. The apparatus includes a chamber which can be sealed whereby it may be pressurized or a vacuum may be drawn. Inside the chamber is a transducer sensitive to the flexible surface of the package to be tested. Positioning of the transducer against the package to be tested is done automatically by a device which is computer controlled. The sequence of testing is also computer controlled whereby the chamber is sealed with the package in it, the probe is automatically adjusted to contact the flexible surface, the pressure of vacuum is applied to the chamber in order to test the integrity and thereafter the condition of the package is analyzed and recorded by a computer which receives the signal generated from the measuring transducers. The information is analyzed by the computer and a decision made regarding the airtightness of the package using either linear regression analysis or peak detection. Any change in the flexible surface of the package is monitored and considered throughout the test sequence. The information derived from the transducers is recorded on, for example, a strip chart or a CRT and thereafter the pressure or vacuum in the chamber is released whereby the package can be removed and contents replaced therein for testing.

10 Claims, 4 Drawing Figures

ELECTRONIC AIRTIGHTNESS TESTER

BACKGROUND OF THE INVENTION

This invention relates to a piece of equipment designed to test the integrity of the package for a product which must be hermetically sealed. There are a variety of container types and packages which are capable of protecting the product therein and preventing the transmission of air and the like to and from the product. Such containers and packages include metal cans, flexible pouches, waxed paper containers, bottles, bags, vials, cartons, strip packages, blisters, pouches and the like. Once a product is placed inside such a container and hermetically sealed therein, there generally remains a head space between the product and the package. This head space can be pressurized in, for example, a soda pop container or can be under vacuum in, for example, a food retorted container; or it can be at ambient pressure.

No matter what the initial internal pressure condition of the package, a test should be performed to determine the integrity of the package. Without proper testing, safety and product quality problems will occur without notice and correction. Such testing equipment is sometimes used prior to packing to see that there are no pinholes or the like in the container. Similarly, there are tests such as "Dud Detectors" which examine one flexible end of a metal can by checking the flexure of same. If the end flexes under mechanical load, it is an indication that a proper vacuum has not been achieved inside the retorted food container. This technique has been used as well in connection with home canning to test the integrity of the seal of the lid rings and caps after the retorting of the canned foodstuff. Such a test is adequate for the semi-rigid end of a rigid container; however, that type of test is inadequate for soft or flexible containers and would be inappropriate to use in connection with a variety of the low cost flexible plastic packages now readily available. Certainly visual inspection of the package is impractical in a high-speed commercial environment.

It, therefore, becomes an object of the present disclosure to teach a means by which any type of container with at least one flexible end can be examined whether the container is to be internally pressurized or externally pressurized, i.e., under vacuum.

It is a further object of the invention disclosed herein to provide container testing which is foolproof, can be operated at high speed, and provide an automatic control and operating system using computer technology.

With the foregoing problems of the prior devices fully understood and appreciated, it is intended herein to disclose the means by which the package integrity for a hermetically sealed product, for its primary package, or for the overpack can be quickly and properly analyzed to determine whether an adequate seal has been achieved and has been maintained. The device disclosed herein is useful not only in the initial packaging, but in subsequent testing to determine shelf life of the product. The details of the preferred embodiment will be fully described herein in connection with its construction and operation.

SUMMARY OF THE DISCLOSURE

The device is called an electronic airtightness tester and it is an automatic test instrument capable of measuring the seal integrity of a package. The packages amenable to this test are any packages which have a flexible or semi-rigid component or part which is capable of slight movement such as collapse or distension when subjected respectively to pressure or vacuum gradients. In order for the electronic airthightness tester to be effective, the package must be designed to provide a hermetic seal.

The apparatus for testing the integrity of a package having one flexible surface positioned for testing includes a sealable chamber into which the package is placed. Also in the chamber is a transducer sensitive to movement of the flexible surface on the package to be tested. Computer control and recording apparatus is provided to set the sequence of the test. Once the package is placed in the chamber the test is commenced by positioning the transducer in contact with the flexible surface then changing the pressure in the chamber and on the test package. Thereafter the signal from the transducer in response to flexure is separated into various sequential instantaneous measurements which are computer analyzed to determine whether or not a hermetic seal exists in the package being tested. Computer analysis of change in peak detection is one approach to the determination of package integrity. Similarly, linear regression analysis is another technique which can be used in a computer comparison for purposes of determining package integrity. The information thus collected is recorded on a strip chart, CRT or the like.

The method for testing the integrity of a package having one flexible surface includes positioning the flexible surface to be measured for exposure to a transducer; adjusting the transducer position to contact the flexible surface; subjecting the package to pressure or vacuum and thereafter analyzing and recording the displacement of the transducer with respect to time and pressure (vacuum) for indicating the condition of package integrity.

The preferred embodiment herein will be described in connection with a package that is placed in a vacuum chamber such that the package balloons outwardly and the probe measures that displacement. It should be appreciated, however, that there are packages which could be placed in a fluid pressurized chamber and tested to see that internal pressure in the container is acceptable.

DETAILED DESCRIPTION OF THE DRAWINGS

Figure 1:
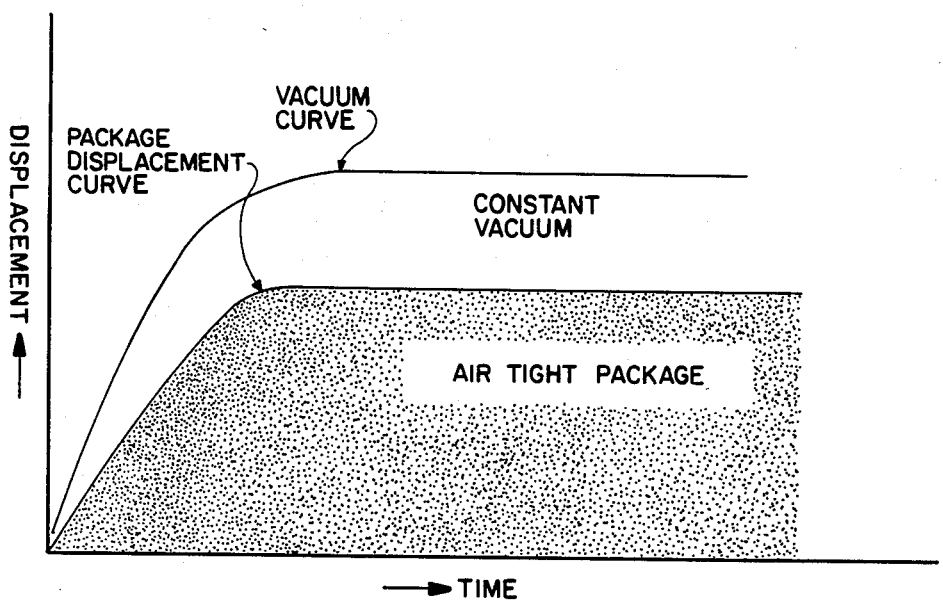
FIG. 1 is a displacement versus time diagram (under an equiliberating vacuum condition) shown the situation wherein the package has a hermetic seal.
Figure 2:
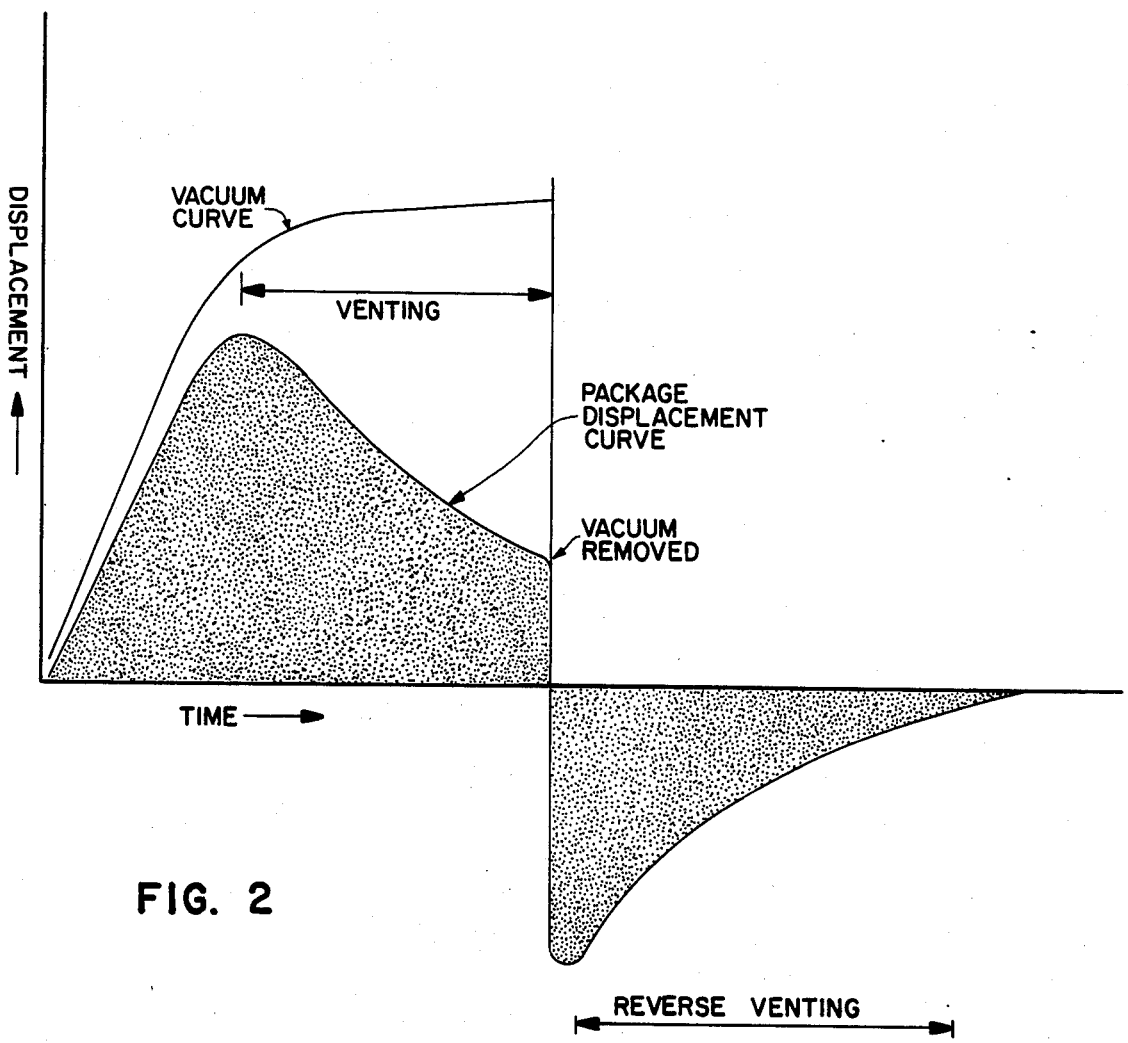
FIG. 2 is a displacement versus time diagram (under an equiliberating vacuum condition) showing the situation wherein the package is not hermetically sealed and leaks. This figure also shows what happens at a later time when the tester is allowed to come to atmospheric pressure after a test in which vacuum has been applied.

If a flexible pouch or semiflexible package is placed in a chamber veing evacuated, the package will expand in an attempt to equalize its internal head space pressure with the external vacuum. An airtight package will expand and maintain its expanded volume for as long as the external vacuum is applied. In FIG. 1 the displacement versus time plot for this condition is shown. A non-airtight package, under the same conditions, will expand initially and then slowly collapse as the vacuum draws air from the package through the leak. In FIG. 2 the displacement versus time plot for this condition is illustrated. The rate at which the package expands and collapses under controlled conditions is a function of the degree of package airtightness.

Figure 4:
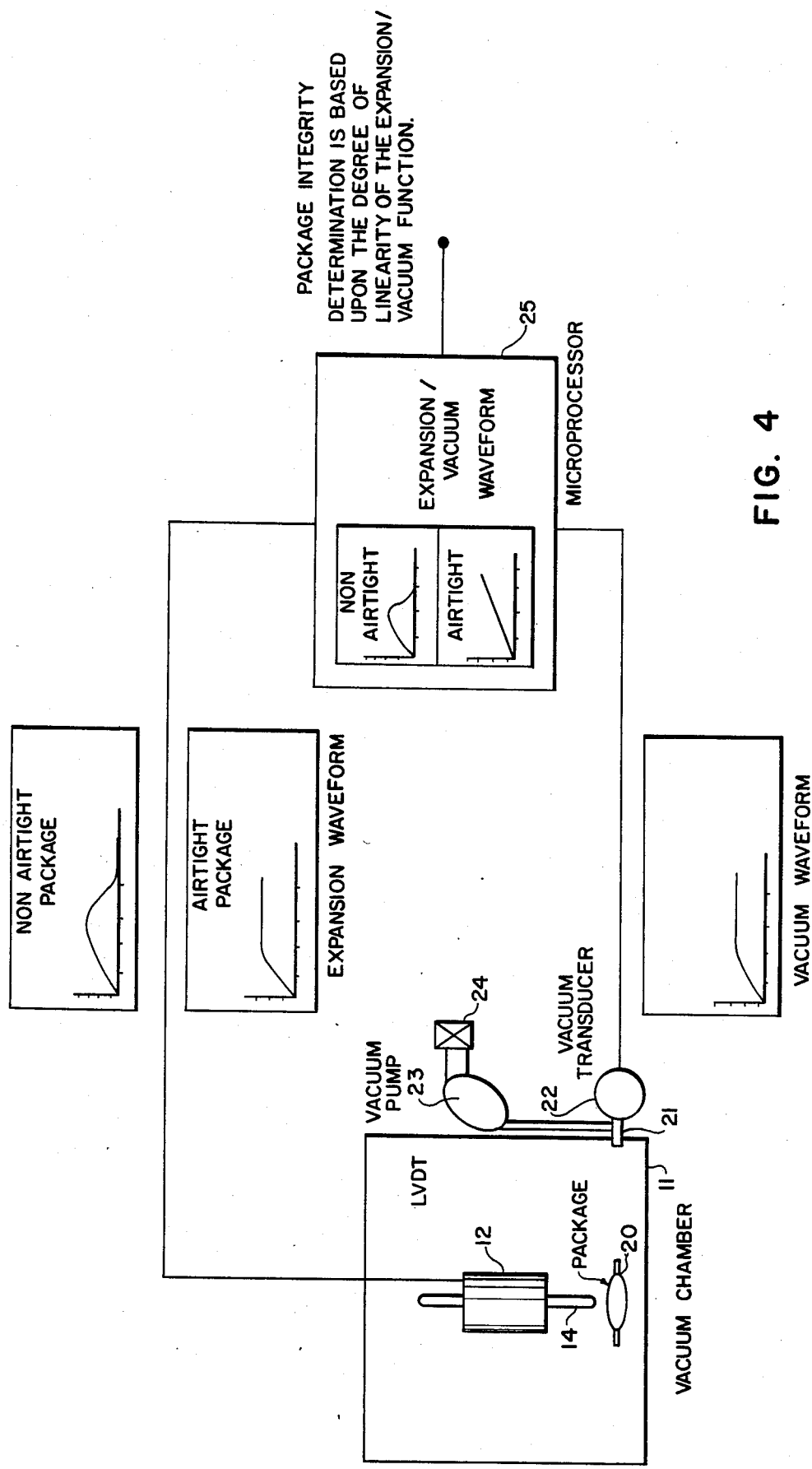
FIG. 4 is a simplified block diagram showing the circuitry necessary for recording the testing with the electronic air tightness tester of the present invention.

The application of this concept lies in having an accurate means of measuring package expansion under very slight vacuum conditions. The overall scheme of this equipment is shown in FIG. 4 as a simplified block and schematic diagram of the concept. Fortunately, measurement of package displacement can be accomplished by using a device called a Linear Variable Differential Transformer (LVDT). The LVDT is an electronic transducer which generates a voltage signal proportional to the displacement of a core rod mounted within the cylindrical housing of the differential transformer.

Figure 3:
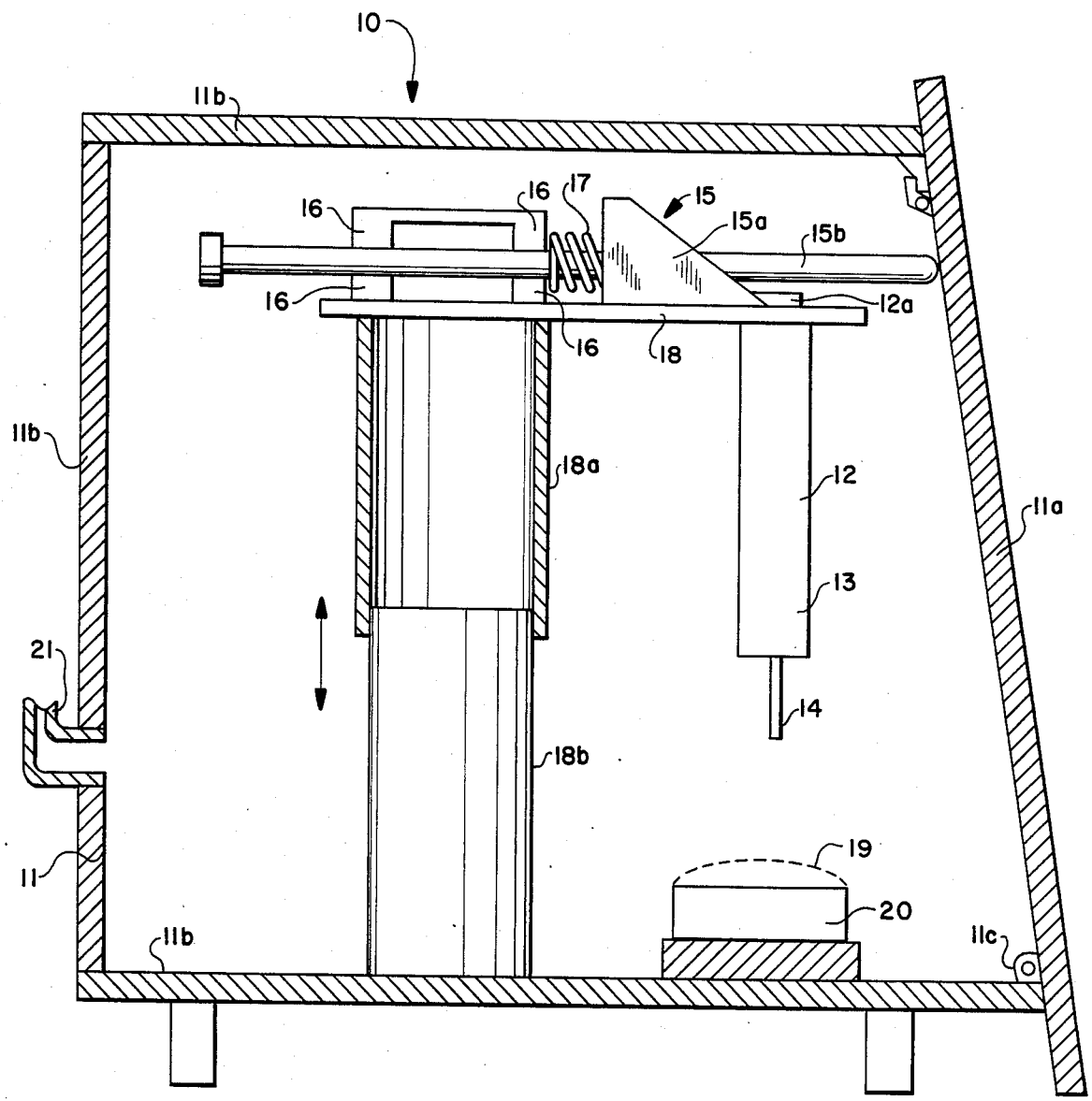
FIG. 3 is a rather schematic view in side cross sectional view of one form of the apparatus necessary to perform the test.

The instrument 10 in FIG. 3 consists of a vacuum chamber 11 having a hinged door 11a and walls 11b. Hinge 11c is located at the bottom of the door 11a and such that same swings open outwardly from the top. The vacuum chamber 11 contains a transducer being a linear variable differential transformer (LVDT) 12. Transducer 12 has a cylindrical transformer 13 and a probe or free-floating core rod 14 such that when the core rod moves within the transformer 13 a signal voltage is affected in accordance with the position of the core rod. A cam actuated lifting mechanism 15 supports the LVDT transducer core 14 and moves same in response to the position of the door 11a. That is to say that, mechanism 15 includes a cam ramp 15a which slides under a follower 12a on the transducer LVDT core 14 to lift same as door 11a is opened outwardly about its hinge 11c. A plunger 15b is part of mechanism 15 and is mounted for movement responsive to the door 11a. In particular, there are bushings 16 which support the plunger 15b for horizontal movement in response to a compensation spring 17 which bears against the cam 15a which is fixedly connected to the plunger 15b. Therefore, movement of plunger 15b is in response to the position of door 11a. Conversely, as the door 11a is closed, plunger 15b is forced backwardly into vacuum chamber 11 against the load of spring 17 thereby compressing same. In FIG. 3 the transducer LVDT core 14 is shown in its lowest position and cam ramp 15a is shown fully inwardly of the vacuum chamber 11 such that follower 12a is at its bottom or most lowest position.

The transducer LVDT 12 is mounted for movement apart from mechanism 15 which is also carried for vertical movement by another mechanism called a vertical translation platform 18 which can be any kind of elevator mechanism including a stepping motor, hydraulics, air cylinder or the like. For schematic simplicity, platform 18 is supported by a piston 18b and cylinder 18a. Vertical translation platform 18 is disposed between the bottom of the vacuum chamber 11 and the mechanism 15 such that the entire mechanism 15 including the transducer LVDT 12 can be raised and lowered. Vertical translation platform 18 is capable of positioning the transducer LVDT 12 such that the core rod 14 just contacts an expandable portion 19 of a package 20 whereby the positioning of the transducer LVDT 12 is within the dynamic range of the core rod 14. The vertical translation platform 18 is connected and controlled by circuitry which limits the vertical translation of the platform 18 to within a predetermined operational range. This can be done by optical interrupter switches (not shown) or any other means which is well known in the art.

Mounted externally, and connected to the vacuum chamber 11 with airtight tubing 21 is a vacuum transducer 22 (see FIG. 4). This transducer 22 monitors the vacuum in the chamber 11 during testing. A vacuum pump 23 is also connected to the chamber with tubing 21. The vacuum pump 23 evacuates the chamber during testing. A solenoid valve 24 is connected in-line or in a "T" connection with the vacuum pump 23. The solenoid valve 24 opens momentarily at the end of the test to equilibrate the chamber vacuum so that the door 11a can easily be opened.

The sequencing of the test requires the following method having steps of positioning the transducer and flexible surface relative to one another then enclosing the transducer and surface in an airtight chamber and thereafter adjusting the probe of the transducer to be in contact with the flexible surface of the package. Application of pressure to the inside of the sealed chamber follows with a recording of the signal output from the probe in response to movement of the flexible surface. The method also includes the concept of feeding the information to a computer for analysis and comparison such that a decision can be made relative to the integrity of the package.

The block diagram of FIG. 4 shows the vacuum chamber 11 schematically on the left side of the diagram with the package 20 and the LVDT 12 inside the vacuum chamber 11. Two signals are derived during the test. One is an indication of the position of the core rod in the LVDT. That signal is shown as a line which extends upwardly out of the vacuum chamber 11 and across to the block for the microprocessor 25. As indicated above that line, there is a time versus displacement plot showing the non-airtight package. Just beneath the line there is the time versus displacement plot of the wave form which is obtained when the package is airtight. This information in terms of the signal derived from the LVDT 12 is fed into the microprocessor 25.

Also fed to the microprocessor 25 is a signal from vacuum obtained from the vacuum chamber 11. That signal indicates the state of the test; that is, the vacuum condition at the corresponding package displacement achieved in the chamber 11. Therefore, the vacuum wave form shown in FIG. 3 below the vacuum signal line indicates the transmission of the signal from the vacuum transducer 22 to the microprocessor 25 over the same period of time as the expansion waveform. By means of a linear regression analysis, the correlation between the vacuum and expansion curves can be determined. The displacement of the airtight package will have a good linear correlation with the vacuum—the leaking package will not. The resulting wave forms are shown inside the block for the microprocessor 25. It is apparent that the non-airtight package has a different wave form than the airtight package. That difference can be compared in the microprocessor 25 in order to find the integrity of the tested package. The particular or preferred approach for analysis by the microprocessor 25 is linear regression analysis of the displacement- /vacuum curve or displacement against standard data. Peak detection circuitry could also be used to check the curve for fall-off due to leakage.

While a particular embodiment has been shown and described in connection with the disclosure of an electronic air tightness tester 10, those skilled in the art will no doubt appreciate that variations to the construction and individual components can be applied without deviating from the broader aspects of the invention. Therefore, in the claims that follow the basic concept of an apparatus and method for testing the integrity of the package with at least one flexible surface is sought to be protected.

I claim:

1. An apparatus for testing the integrity of a package with at least one flexible surface being positioned for testing, comprising:
    a chamber having an inside space defined by walls to form an airtight enclosure sufficient to contain the package to be tested and test means having a transducer which has a probe, said transducer positionable within the dynamic range of the probe and sensitive to movement of the flexible surface on said package, and
    positioning means connected between a wall of said chamber and said transducer to locate same against the flexible surface at a first condition wherein said chamber is closed but at atmospheric pressure and to hold said transducer in position during a second condition wherein said chamber is evacuated causing outward flexure of the package surface.

2. An apparatus for testing the airtight security of a container having at least a surface movable in response to pressure changes about the container, comprising:
    a sealed enclosure to surround the container,
    an LVDT with a probe mounted in said enclosure to contact the container surface,
    an adjustment means between said LVDT and said enclosure to bring said probe thereof into contact with the surface to be tested and to position said LVDT within the dynamic range of said probe,
    a source of fluid pressure change for said enclosure to movably affect the surface of the container to be tested.

3. The apparatus of claim 2 wherein computer means is provided to control said adjustment means and said pressure source and to analyze and record the output of said probe.

4. The apparatus of claim 2 wherein said adjustment means includes first and second mechanisms for fine and coarse movement to bring said probe into contact.

5. The apparatus of claim 4 wherein said second mechanism for course movement includes a cam and follower, the latter being responsive to movement of a door on said enclosure to cam said transducer and its probe away from the surface of the container to be tested.

6. A method for testing the integrity of a package with at least one relatively flexible surface including the following steps:
    positioning the flexible surface and the probe of a measuring transducer relative to one another for contact during measurement,
    enclosing the probe and the flexible surface of the package in an airtight sealed chamber,
    adjusting the initial position of the probe in two stages wherein the first stage includes camming the transducer toward the flexible surface upon closing the sealed chamber and the second stage includes fine adjustment of the transducer position to be within the range of the probe to just contact the flexible package surface,
    applying a pressure change to the inside of the sealed chamber, and
    recording the signal output of the probe relative to movement of the flexible surface.

7. The method of claim 6 wherein computer analyzing is performed on the recorded signal output of the probe.

8. The method for analyzing the integrity of a package with at least one relatively flexible surface including the following steps:
    obtaining a signal representative of the movement of the flexible surface relative to pressure change,
    obtaining a signal representative of pressure change,
    mathematically analyzing the flexible surface signal and the pressure signal relative to one another to obtain an indication of their relative relationship being indicative of the integrity of the package.

9. The method of claim 8 wherein said pressure signal is compared with said flexible surface signal at equivalent points in time to provide a resultant signal which is representative of the movement of the flexible surface of the package.

10. The method of claim 9 wherein said resultant signal is compared to a datum or standard signal representative of a package with integrity and deviation from same is an indication of a defective package.

* * * * *

UNITED STATES PATENT AND TRADEMARK OFFICE
CERTIFICATE OF CORRECTION

PATENT NO. : 4,663,964
DATED : May 12, 1987
INVENTOR(S) : Carlo Croce

It is certified that error appears in the above-identified patent and that said Letters Patent is hereby corrected as shown below:

<u>In the Specification</u>

Column 2, line 5, "airthightness" should read --airtightness--.

Column 2, line 50, "shown" should read --showing--.

Column 2, the last line, "veing" should read --being--.

<u>In the Claims</u>

Claim 5, line 2 thereof, "course" should read --coarse--.

Claim 8, line 1 thereof, the first occurence of "The" should read --A--.

Signed and Sealed this

Ninth Day of February, 1988

Attest:

DONALD J. QUIGG

Attesting Officer

Commissioner of Patents and Trademarks